US012450937B2

(12) United States Patent
Sharma et al.

(10) Patent No.: US 12,450,937 B2
(45) Date of Patent: Oct. 21, 2025

(54) AUTOMATIC FORM DOCUMENT PROCESSING

(71) Applicant: Optum, Inc., Minnetonka, MN (US)

(72) Inventors: Aviral Sharma, Jaipur (IN); Jatin Lamba, Kheri (IN); Shreyansh Nanawati, Kalyan (IN); Dinesh Bajaj, Gurugram (IN)

(73) Assignee: Optum, Inc., Minnetonka, MN (US)

( * ) Notice: Subject to any disclaimer, the term of this patent is extended or adjusted under 35 U.S.C. 154(b) by 453 days.

(21) Appl. No.: 18/062,099

(22) Filed: Dec. 6, 2022

(65) Prior Publication Data

US 2024/0185630 A1 Jun. 6, 2024

(51) Int. Cl.
| | |
|---|---|
| *G06V 30/416* | (2022.01) |
| *G06V 10/82* | (2022.01) |
| *G06V 30/10* | (2022.01) |
| *G06V 30/19* | (2022.01) |
| *G06V 30/414* | (2022.01) |

(52) U.S. Cl.
CPC ............ *G06V 30/416* (2022.01); *G06V 10/82* (2022.01); *G06V 30/10* (2022.01); *G06V 30/19173* (2022.01); *G06V 30/414* (2022.01)

(58) Field of Classification Search
CPC ...... G06V 10/82; G06V 30/10; G06V 30/414; G06V 30/416; G06V 30/19173; G06F 16/93; G06F 40/295
See application file for complete search history.

(56) References Cited

U.S. PATENT DOCUMENTS

| | | | |
|---|---|---|---|
| 11,257,594 | B1 | 2/2022 | Krasnoslobodtsev et al. |
| 2018/0032678 | A1 | 2/2018 | Dandala et al. |
| 2020/0234806 | A1 | 7/2020 | Sellars |
| 2020/0388401 | A1 | 12/2020 | Spiro et al. |
| 2022/0138599 | A1 | 5/2022 | Aravamudan et al. |

(Continued)

FOREIGN PATENT DOCUMENTS

EP 3859745 A1 8/2021

OTHER PUBLICATIONS

Christopoulou, "Textual Relation Extraction with Edge-Oriented Graph Neural Models", Aug. 1, 2020, 227 pp., URL: https://pure.manchester.ac.uk/ws/portalfiles/portal/173349138/FULL_TEXT.PDF.

(Continued)

*Primary Examiner* — Daniel G Mariam
(74) *Attorney, Agent, or Firm* — Shumaker & Sieffert, P.A.

(57) ABSTRACT

A method comprises identifying entities in a form document; for each of the entities, generating a vector for the entity that comprises a plurality of values describing content of the entity and a position of the entity within the form document; identifying, by the computing system, pairs of the entities that satisfy a spatial relationship requirement; for each pair of entities satisfying the spatial relationship requirement, applying a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and processing the form document based on the semantic relationships between the entities.

15 Claims, 5 Drawing Sheets

(56) References Cited

U.S. PATENT DOCUMENTS

2022/0164683 A1* 5/2022 Hao .................. G06F 16/35
2022/0172837 A1  6/2022 Pagi et al.
2022/0223245 A1  7/2022 Zhang

OTHER PUBLICATIONS

Li et al., "Classifying relations in clinical narratives using segment graph convolutional and recurrent neural networks (Seg-GCRNs)", vol. 26, No. 3, Journal of the American Medical Informatics Association, Mar. 26, 2019, pp. 262-268, URL: https://academic.oup.com/jamia/article/26/3/262/5263777.

Luo et al., "Natural Language Processing for EHR-Based Pharmacovigilance: a Structured Review", Springer International Publishing, Jun. 22, 2017, pp. 1075-1089, URL: https://www.researchgate.net/publication/317849519_Natural_Language_Processing_for_EHR-Based_Pharmacovigilance_A_Structured_Review.

\* cited by examiner

PRESCRIPTION REFILL REQUEST

Patient information

| | |
|---|---|
| Name:<br>John Smith | Member ID number:<br>123456 |
| Date of birth:<br>01/01/1980 | Phone number:<br>(555)555-0001 |

Prescriber information

| | |
|---|---|
| Prescriber Name:<br>Jane Ramirez | Prescriber ID:<br>654321 |
| Prescriber Phone number:<br>(555)555-1111 | Prescriber Fax number:<br>(555)555-2222 |

Refill requested by your patient

| | |
|---|---|
| Prescription number:<br>324555212 | Last fill date:<br>7/7/2022 |
| Medication and strength:<br>Trazodone HCL Tab 100Mg | |
| Directions:<br>Take 1 or 2 tablets by mouth daily at bedtime as needed for sleep | Quantity: 120 |

FIG. 3

REFILL REQUEST — 400

| | |
|---|---|
| Patient information | Patient Name | John Smith |
| Patient information | Member ID number | 123456 |
| Patient information | Date of birth | 01/01/1980 |
| Patient information | Phone number | (555)555-0001 |
| Prescriber information | Prescriber Name | Jane Ramirez |
| Prescriber information | Prescriber ID | 654321 |
| Prescriber information | Prescriber phone number | (555)555-1111 |
| Prescriber information | Prescriber fax number | (555)555-2222 |
| Refill requested by your patient | Prescription number | 324555212 |
| Refill requested by your patient | Medication and strength | Trazodone HCL Tab 100 Mg |
| Refill requested by your patient | Directions | Take 1 or 2 tablets by mouth... |
| Refill requested by your patient | Last fill date | 7/7/2022 |
| Refill requested by your patient | Quantity | 120 |

FIG. 4

AUTOMATIC FORM DOCUMENT PROCESSING

BACKGROUND

Form documents are ubiquitous in commerce and government. Form documents may have a predefined arrangement of questions into which specific answers are entered. Even though form documents may have the same questions and answers, the spatial arrangement of the questions and answers within different form documents may vary. For example, the form documents for construction permit requests for two different municipalities may contain the same questions and answers, but the arrangement of the questions and answers, as well as headings, may be entirely different.

SUMMARY

In general, this disclosure describes techniques for automatic form document processing. As described herein, a computing system identifies entities in a form document. Each of the entities may include one or more words, numbers, symbols, or other elements having semantic value. For each of the entities, the computing system may generate a vector for the entity that comprises a plurality of values describing content of the entity and describing a position of the entity within the form document. Furthermore, the computing system may identify pairs of the entities that satisfy a spatial relationship requirement, such as a spatial distance requirement. The computing system may determine semantic relationships between pairs of the entities that satisfy the spatial relationship requirement. For instance, for each pair of entities satisfying the spatial relationship requirement, the computing system may apply a classification machine-learned (ML) model that takes as input the vectors for the pair of entities and outputs a category for a first entity of the pair of entities and a category for a second entity of the pair of entities. A combination of the category for the first entity and the category for the second entity represents a semantic relationship between the first entity and the second entity. The computing system may then process the form document based on the semantic relationships between the entities. The example techniques may allow the computing system to process form documents having different formats.

In one aspect, this disclosure describes a method comprising: identifying, by a computing system, entities in a form document; for each of the entities, generating, by the computing system, a vector for the entity, the vector for the entity comprising a plurality of values describing content of the entity and describing a position of the entity within the form document; identifying, by the computing system, pairs of the entities that satisfy a spatial relationship requirement; determining semantic relationships between pairs of the entities that satisfy the spatial relationship requirement, wherein determining semantic relationships between the pairs of the entities that satisfy the spatial relationship requirement comprises, for each pair of entities satisfying the spatial relationship requirement, applying, by the computing system, a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and processing, by the computing system, the form document based on the semantic relationships between the pairs of the entities that satisfy the spatial relationship requirement.

In another aspect, this disclosure describes a system comprising: a storage device configured to store a form document; and one or more processors implemented in circuitry and configured to: identify entities in the form document; for each of the entities, generate a vector for the entity, the vector for the entity comprising a plurality of values describing content of the entity and describing a position of the entity within the form document; identify pairs of the entities that satisfy a spatial relationship requirement; determining semantic relationships between pairs of the entities that satisfy the spatial relationship requirement, wherein the one or more processors are configured to, as part of determining semantic relationships between the pairs of the entities that satisfy the spatial relationship requirement, for each pair of entities satisfying the spatial relationship requirement, apply a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and process the form document based on the semantic relationships between the pairs of the entities that satisfy the spatial relationship requirement.

In another aspect, this disclosure describes a non-transitory computer-readable storage medium comprising instructions that, when executed, cause one or more processors of a computing system to: identify entities in a form document; for each of the entities, generate a vector for the entity, the vector for the entity comprising a plurality of values describing content of the entity and describing a position of the entity within the form document; identify pairs of the entities that satisfy a spatial relationship requirement; determine semantic relationships between pairs of the entities that satisfy the spatial relationship requirement, wherein the instructions that cause the one or more processors to determine semantic relationships between the pairs of the entities that satisfy the spatial relationship requirement comprise instructions that, when executed, cause the one or more processors to, for each pair of entities satisfying the spatial relationship requirement, apply a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and process the form document based on the semantic relationships between the pairs of the entities that satisfy the spatial relationship requirement.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF THE DRAWINGS

FIG. 3 is a conceptual diagram illustrating an example form document according to techniques of this disclosure.

FIG. 4 is a conceptual diagram illustrating an example table that indicates relationships between entities in form document according to techniques of this disclosure.

DETAILED DESCRIPTION

Figure 1:
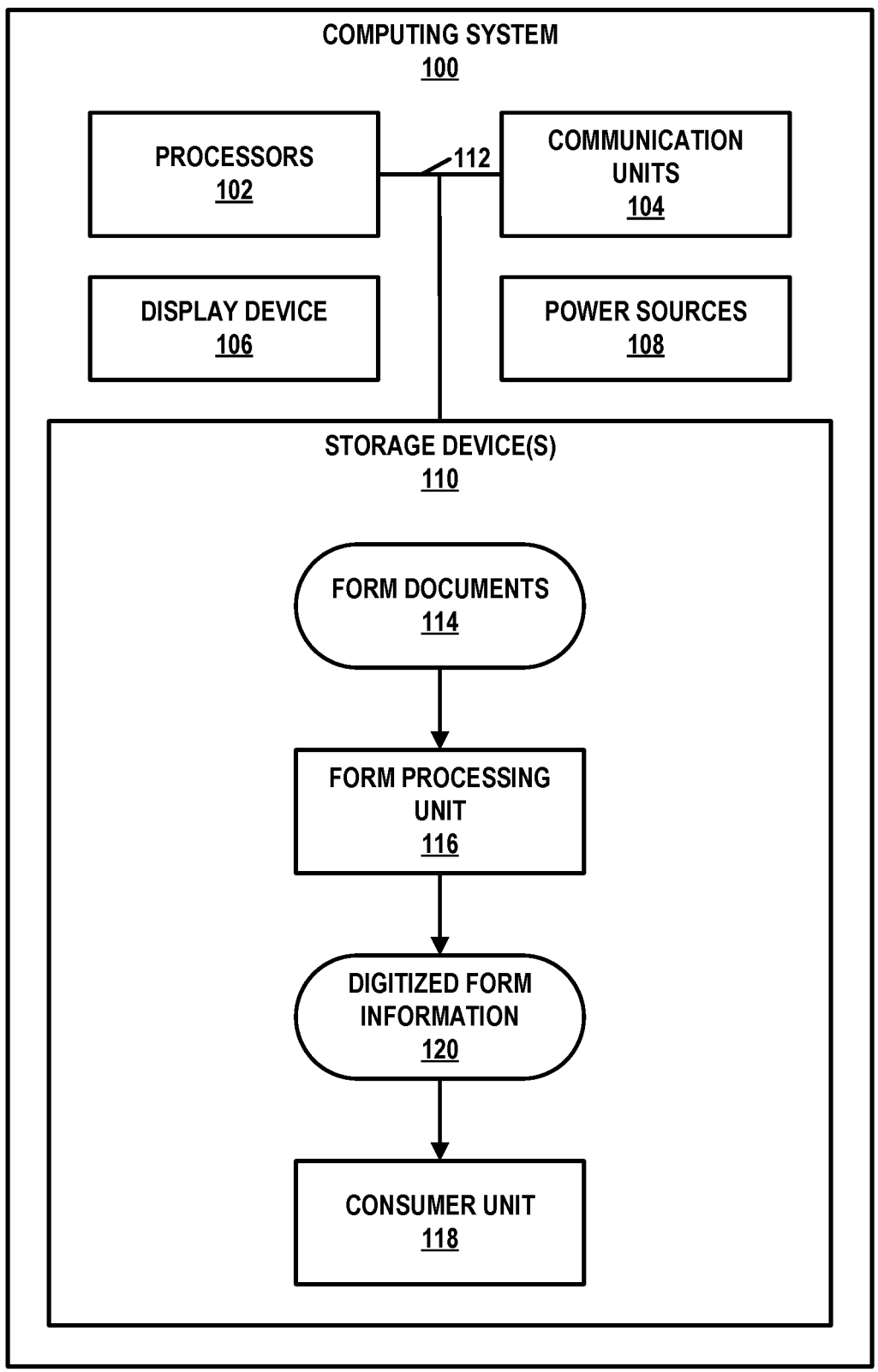
FIG. 1 is a block diagram illustrating an example computing system in accordance with one or more aspects of this disclosure.

Form documents are used in a very wide number of situations, ranging from health care to government. Form documents may have various formats, even if they contain the same information. Nevertheless, an organization may need to process the form documents regardless of their formats. For instance, in a healthcare-related example, when a physician writes a patient a prescription for a pharmaceutical, the physician may fill in information on a form document indicating the name of the patient, the pharmaceutical, the dosage, and other information. The form document may have different labeled fields in which the physician is to fill in the information. The physician may fax or mail the form document to a pharmacy or health insurance provider. Physicians may use a wide variety of form documents for this purpose. For example, fields indicating the patient's name may appear at different locations on different form documents. A health insurance provider may want to be able to easily review prescription form documents, e.g., to determine whether the physician is prescribing appropriate doses of a pharmaceutical. However, the variety of form documents used may hinder the ability of computing systems to automatically review prescription forms.

Techniques of this disclosure provide a solution that enables a computing system to automatically process form documents. For example, the computing system may review content of prescription forms or other types of form documents. To process the content of a form document, the computing system may identify entities within the form document. Each of the entities may be a word (e.g., "name") or string of words (e.g., "patient name"), a number, or other unit of text.

The computing system may identify pairs of the entities that satisfy a spatial relationship requirement. For instance, the computing system may generate an adjacency matrix that includes a row corresponding to each of the entities and a column corresponding to each of the entities. The data in a cell of the adjacency matrix indicates whether the entity corresponding to a row of the cell and the entity corresponding to a column of the cell satisfy a spatial relationship requirement. Thus, the adjacency matrix may represent a graph of nodes corresponding to entities and connections between the nodes. Two entities may satisfy the spatial relationship requirement if the entities have a given spatial relationship to one another. For example, two entities may satisfy the spatial relationship requirement if the two entities are immediately above and below each other, immediately left or right of each other, within a specific distance of one another, etc.

The computing system may generate a vector for each of the entities. The vector for each entity may describe content of the entity (e.g., the word/phrase itself) and the position of the entity (e.g., coordinates of a bounding box surrounding the entity). In some examples, the vector for an entity may also include information describing content and positions of connected entities in the graph.

For each pair of entities satisfying the spatial relationship requirement, the computing system may provide the vectors of the pair of entities as input to a classification machine-learned (ML) model. The classification ML model may include a neural network that takes the two vectors of the pair of entities as inputs and generates two outputs. The classification ML model may therefore be considered as a "Siamese neural network." The two outputs of the classification ML model include a category for a first entity of the pair and a category for a second entity of the pair. The categories that may be identified by the classification ML model are: "header", "question", "answer", and "other."

The combination of the categories for the first entity and the second entity may represent a semantic relationship between the first entity and the second entity. For example, when the classification ML model outputs a category of "header" for the first entity and "question" for the second entity, this means the semantic relationship between the first and second entities is that the second entity represents a question within an area of the form described by the header. For example, the first entity may be the phrase "Patient Information" and the second entity may be the phrase "Name". When the classification ML model outputs a category of "header" for the first entity and "answer" for the second entity, this means that the semantic relationship between the first and second entities is that the second entity represents an answer to a question within an area of the form described by the header.

For example, the first entity may be the phrase "Patient Information" and the second entity may be the phase "John Smith." When the classification ML model outputs a category of "question" for the first entity and "answer" for the second entity, this means that a semantic relationship between the first and second entities is that the second entity represents an answer to the question represented by the first entity. For example, the first entity may be the phrase "Name" and the second entity may be the phrase "John Smith." In another example, the first entity may be the phrase "Drug Name" and the second entity may be "codeine." The classification ML model outputting a category of "answer" for the first entity and the second entity means the first entity and the second entity are part of the same answer or answers to different questions. After the classification ML model has determined the categories for each pair of entities in the graph, the computing system may process the form document based on the semantic relationships between the entities.

The techniques of this disclosure, and especially the use of a classification ML model that takes vectors for two entities and outputs two categories may be an efficient and reliable way for computing systems to determine the semantic relationships of entities within forms. For instance, the techniques of this disclosure may enhance the ability of a computing system to accurately process forms, even if the form documents have formats for which the computing system has not been programmed.

FIG. 1 is a block diagram illustrating an example computing system 100 in accordance with one or more aspects of this disclosure. In the example of FIG. 1, computing system 100 includes one or more processors 102, one or more communication units 104, a display device 106, one or more power sources 108, one or more storage devices 110, and one or more communication channels 112. Computing system 100 may include other components. For example, computing system 100 may include input devices, output devices, display screens, and so on. Communication channels 112 may interconnect each of processors 102, communication units 104, and storage devices 110 for inter-component communications (physically, communicatively, and/or operatively). In some examples, communication channels 112 may include a system bus, a network connection, an inter-process communication data structure, or any other method for communicating data. Power sources 108 may provide electrical energy to processors 102, communication units 104, storage devices 110 and communication channels 112. Storage devices 110 may store information required for use during operation of computing system 100.

Processors 102 comprise circuitry configured to perform processing functions. For instance, one or more of processors 102 may be a microprocessor, an application-specific integrated circuit (ASIC), a field-programmable gate array (FPGA), or another type of processing circuitry. In some examples, processors 102 of computing system 100 may read and execute instructions stored by storage devices 110. Processors 102 may include fixed-function processors and/or programmable processors. Processors 102 may be included in a single device or distributed among multiple devices.

Communication units 104 may enable computing system 100 to send data to and receive data from one or more other computing devices (e.g., via a communications network, such as a local area network or the Internet). In some examples, communication units 104 may include wireless transmitters and receivers that enable computing system 100 to communicate wirelessly with other computing devices. Examples of communication units 104 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 100 may use communication units 104 to communicate with one or more other computing devices or systems. Communication units 104 may be included in a single device or distributed among multiple devices.

Processors 102 may read instructions from storage devices 110 and may execute instructions stored by storage devices 110. Storage devices 110 may include non-transitory computer-readable storage media. Execution of the instructions by processors 102 may configure or cause computing system 100 to provide at least some of the functionality ascribed in this disclosure to computing system 100. Storage devices 110 may be included in a single device or distributed among multiple devices.

As shown in the example of FIG. 1, storage devices 110 may store form documents 114. Form documents 114 may include digital copies of documents containing filled or fillable forms. Example form documents 114 may include scanned form documents, PDF form documents, digitally native documents, word processor documents, and so on. A specific example type of form document may be a prescription refill request document. Other types of form documents may include permit request forms, police incident reports, tax return forms, insurance reimbursement request forms, and so on.

Storage devices 110 also include computer-readable instructions associated with a form processing unit 116 and a consumer unit 118. Execution of the instructions associated with form processing unit 116 and consumer unit 118 by processors 102 may cause computing system 100 to perform the actions ascribed in this disclosure to form processing unit 116 or its subcomponents, and consumer unit 118 or its subcomponents.

Form processing unit 116 may process form documents 114 for one or more purposes. For example, form processing unit 116 may process form documents 114 to extract machine-usable relationships between entities in form documents 114 for purposes of data entry. In some examples where form documents 114 include a prescription refill form, form processing unit 116 may process the prescription refill form to determine whether a prescription refill is appropriate for a patient.

Processing form documents 114 may be technically challenging for computing systems. Form documents 114 can be formatted in significantly different ways, even if the form documents ultimately have the same semantic content. For example, two different prescription refill request forms from two different physicians may look totally different, but ultimately may be requesting a refill for the same patient for the same drug. Thus, simply applying optical character recognition (OCR) to form documents to extract the words in form documents may not be sufficient for a computing system to extract semantic content of the form document. For instance, existing OCR solutions may only retrieve text from a given form document, and do not extract relationships that exist between entities. However, proper processing of a form document may involve understanding relationships between entities in the form document. Existing OCR solution may give results only in a sequential manner, indicating only a top-down flow of information, and not capturing relationships that exist in other directions. Complex form-like and tabular documents have multi-directional flows of information, which an OCR solution cannot digitize contextually and meaningfully. Moreover, in some form documents, there are indirect relationships that exist between two entities. For instance, a header and bullet points may be linked indirectly because bullet points after the first bullet point do not follow the header.

This disclosure describes techniques that may address this technical challenge. As described in this disclosure, form processing unit 116 may identify entities in a form document. For instance, form processing unit 116 may apply OCR to a form document to identify entities in the form document. Form processing unit 116 may consolidate some of the entities identified using OCR. The entities may include words, string of words, numbers, drawings, signatures, and other semantic elements within the form document.

Form processing unit 116 may identify pairs of the entities that satisfy a spatial relationship requirement. For instance, form processing unit 116 may generate an adjacency matrix that includes rows and columns corresponding to the entities. The adjacency matrix indicates that two of the entities are related based on the two entities having a predefined spatial relationship to each other. For each of the entities, form processing unit 116 may compute a vector for the entity that comprises a plurality of values describing content of the entity and describing a position of the entity within the form document. For each pair of entities marked as related in the adjacency matrix, form processing unit 116 may apply a classification ML model that takes as input the vectors for the pair of entities and outputs a category for a first entity of the pair of entities and a category for a second entity of the pair of entities.

Form processing unit 116 may output digitized form information 120 representing the relationships between entities in the form document. As described elsewhere in this disclosure, digitized form information 120 may comprise a table that describes the relationships between entities in the form document.

Consumer unit 118 may use (consume) digitized form information 120. For instance, consumer unit 118 may use digitized form information 120 to check whether a prescription refill request is appropriate for a patient. Consumer unit 118 may use data (not shown in FIG. 1) in addition to digitized form information 120 when using digitized form information 120. For example, consumer unit 118 may use an electronic health record of a patient when checking whether a prescription refill request is appropriate for the patient.

Figure 2:
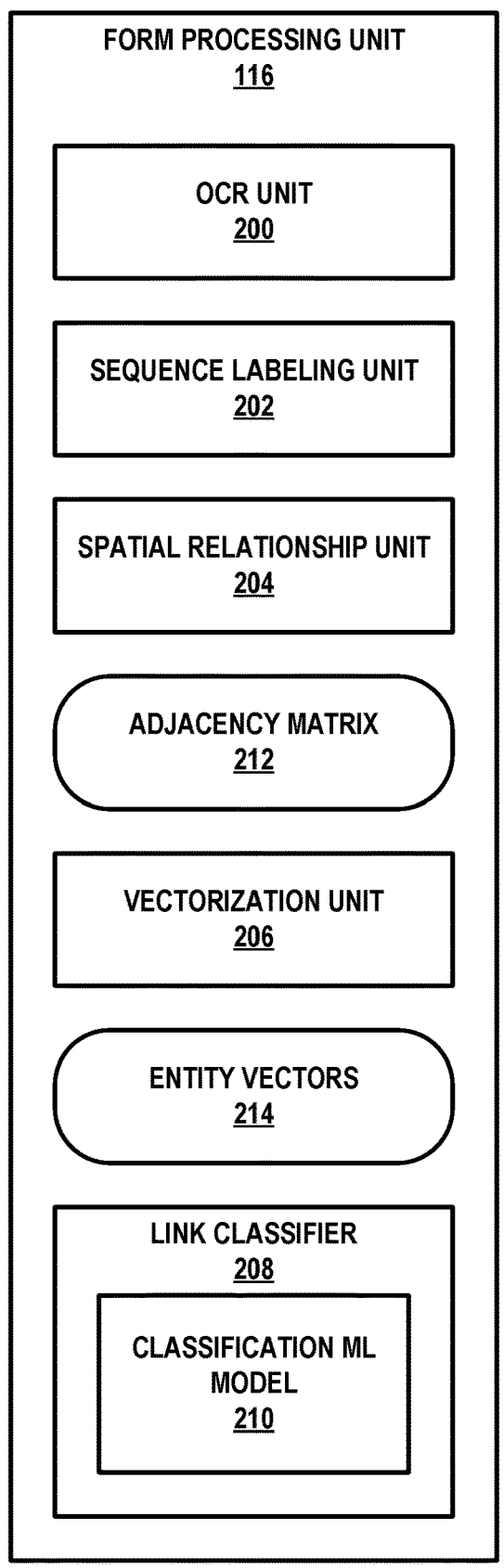
FIG. 2 is a block diagram illustrating example components of a form processing unit according to techniques of this disclosure.

FIG. 2 is a block diagram illustrating example components of form processing unit 116 according to techniques of this disclosure. In the example of FIG. 2, form processing unit 116 includes an OCR unit 200, a sequence labeling unit 202, a spatial relationship unit 204, a vectorization unit 206, and a link classifier 208. Link classifier 208 includes a classification ML model 210. In other examples, form processing unit 116 may include more, fewer, or different components.

OCR unit 200 may apply OCR to a form document to identify entities in the form document and spatial locations of the entities within the form document. As mentioned above, entities may include words, numbers, drawings, and so on. Various OCR software implementations are commercially available.

Sequence labeling unit 202 may combine entities identified by OCR unit 200 to form new entities. For example, OCR unit 200 may identify an entity "John" and an entity "Smith." In this example, sequence labeling unit 202 may combine these entities to form an entity "John Smith." In some examples, sequence labeling unit 202 may perform a process that labels tokens according to a B-I-O-E-S format. A token may be labeled with the B label to indicate a beginning of a chunk of tokens. An I label indicates a token inside a chunk. An O label indicates a token outside of any chunk. An E label indicates a token at the end of a chunk. An S label indicates a chunk containing a single token. In the example of the entities "John" and "Smith," sequence labeling unit 202 may label "John" with a B label and "Smith" with an "I" or "E" label. Sequence labeling unit 202 may then use the labels to determine that "John" and "Smith" are part of the same chunk. Sequence labeling unit 202 may use chunks as entities.

Spatial relationship unit 204 may generate an adjacency matrix 212. Adjacency matrix 212 includes rows and columns corresponding to the entities. Adjacency matrix 212 indicates that two of the entities are related based on the two entities having a predefined spatial relationship to each other. Table 1, below, represents an example of adjacency matrix 212. In Table 1, "X" indicates the presence of a predefined spatial relationship.

Adjacency matrix 212 may represent an adjacency graph. Each entity corresponds to a node in the adjacency graph. Edges in the adjacency graph correspond to relationships between entities.

Spatial relationship unit 204 may determine that two entities have a spatial relationship in one of a plurality of ways. For example, spatial relationship unit 204 may determine that two entities have a spatial relationship based on the two entities being within a specific distance of each other in a horizontal or vertical direction in the form document. In other words, there may be a distance threshold to limit the number of connections so that only relationships between spatially close entities are given weight for purposes of classifying the relationships.

Vectorization unit 206 may generate a vector for each of the entities. The vector for an entity comprises a plurality of values describing content of the entity and a position of the entity within the form document. For example, the vector for an entity may include 768 values representing the entity and 516 values representing a bounding box around the entity, for a total of 1284 values.

In some examples, vectorization unit 206 includes a transformer model and a neural network. The transformer model may be a 12-layer transformer model with 768 hidden sizes, and 12 attention heads, which may contain about 113M parameters. This transformer model may be based on word embeddings and 2-D position embeddings. The neural network may have a linear layer and softmax layer which predicts the corresponding label for each token. Sequence labelling unit 202 may be trained to predict token labels, and once sequence labeling unit 202 is optimized, the vector of size 768 is extracted from the final hidden layer of the transformer model, which is fine-tuned on form understanding task based on a dataset, such as the Form Understanding in Noisy Scanned Documents (FUNSD) Dataset.

Link classifier 208 applies classification ML model 210 for each pair of entities marked as related in adjacency matrix 212. Classification ML model 210 comprises a machine-learned (ML) model. When applied for a pair of entities, classification ML model 210 takes as input the vectors for the pair of entities and outputs a category for a first entity of the pair of entities and a category for a second entity of the pair of entities. Classification ML model 210 may be referred to as a "Siamese" model because classification ML model 210 takes two inputs and generates two outputs, analogous to two ML models joined at the middle.

The category for the first entity and the category for the second entity may be in a plurality of categories that includes header, question, answer, and other. The combination of the categories for the two entities represents a type of semantic relationship between the two entities. For example, if the category for the first entity is "question" and the category for the second entity is "answer," the second entity is an answer to a question posed by the first entity. In another

TABLE 1

|  | "John Smith" | "September" | "(555)555-0001" | "Name" | "Birthdate" | "Phone number" |
|---|---|---|---|---|---|---|
| "John Smith" | Self |  |  | X |  |  |
| "September" |  | Self |  |  | X |  |
| "(555)555-0001" |  |  | Self |  |  | X |
| "Name" | X |  |  | Self |  |  |
| "Birthday" |  | X |  |  | Self |  |
| "Phone number" |  |  | X |  |  | Self | example, if the category for the first entity is "question" and the category for the second entity is "header," the first entity represents a question under the header indicated by the second entity. In another example, if the category for the first entity is "answer" and the category for the second entity is "header," the first entity represents an answer to a question under the header indicated by the second entity. In another example, if the category for the first entity is "answer" and the category for the second entity is also "answer," the first entity and the second entity may represent answers to different questions or different parts of answer to the same question. However, this ambiguity may be resolved by reviewing whether the first entity and the second entity have semantic question-answer relationships with the same question.

Classification ML model 210 may be implemented as an artificial neural network. In some examples, the artificial neural network may be a four-layer neural network that uses a sigmoid activation function.

In some examples, computing system 100 trains classification ML model 210. In other examples, classification ML model 210 is pretrained prior to use by computing system 100. Classification ML model 210 may be trained based on a training data set that includes training data pairs. A training data pair includes two input vectors and includes two expected output categories. The input vectors of training data pairs may be generated by applying the process described above to a corpus of form documents. A human may manually determine the expected output categories for pairs of entities in the corpus of form documents. During training, a forward propagation process may be applied to classification ML model 210 based on the input vectors of a training data pair. An error value may be generated by applying an error function to the categories generated by classification ML model 210 and the expected categories of the training data pair. In some examples, the error function is a triplet loss function. A backpropagation process may then be performed that updates values of weights of inputs to neurons in classification ML model 210 based on the error value. In some examples, classification ML model 210 may be partially pretrained and refinement may only be performed on weights for a last layer of classification ML model 210.

Link classifier 208 may generate digitized form information 120 based on the categories determined by classification ML model 210. For example, link classifier 208 may generate a table that indicates semantic relationships between entities in the form document. In some examples, link classifier 208 may output a graphical representation of a hierarchy indicating the semantic relationships between the entities in the form document.

FIG. 3 is a conceptual diagram illustrating an example form document 300 according to techniques of this disclosure. In the example of FIG. 3, form document 300 is a prescription refill request form. However, in other examples, form document 300 may contain other types of information. In FIG. 3, dashed boxes indicate entities identified by form processing unit 116. As shown in FIG. 3, related entities may have various spatial relationships. For instance, some answers are below the related questions. Other answers (e.g., 120) are next to the related questions (e.g., Quantity).

FIG. 4 is a conceptual diagram illustrating an example table 400 that indicates relationships between entities in form document 300 (FIG. 3) according to techniques of this disclosure. Each row of table 400 represents a relationship from a header level through an answer level for each answer. In some examples, computing system 100 may output table 400 for display, e.g., on display device 106.

Figure 5:
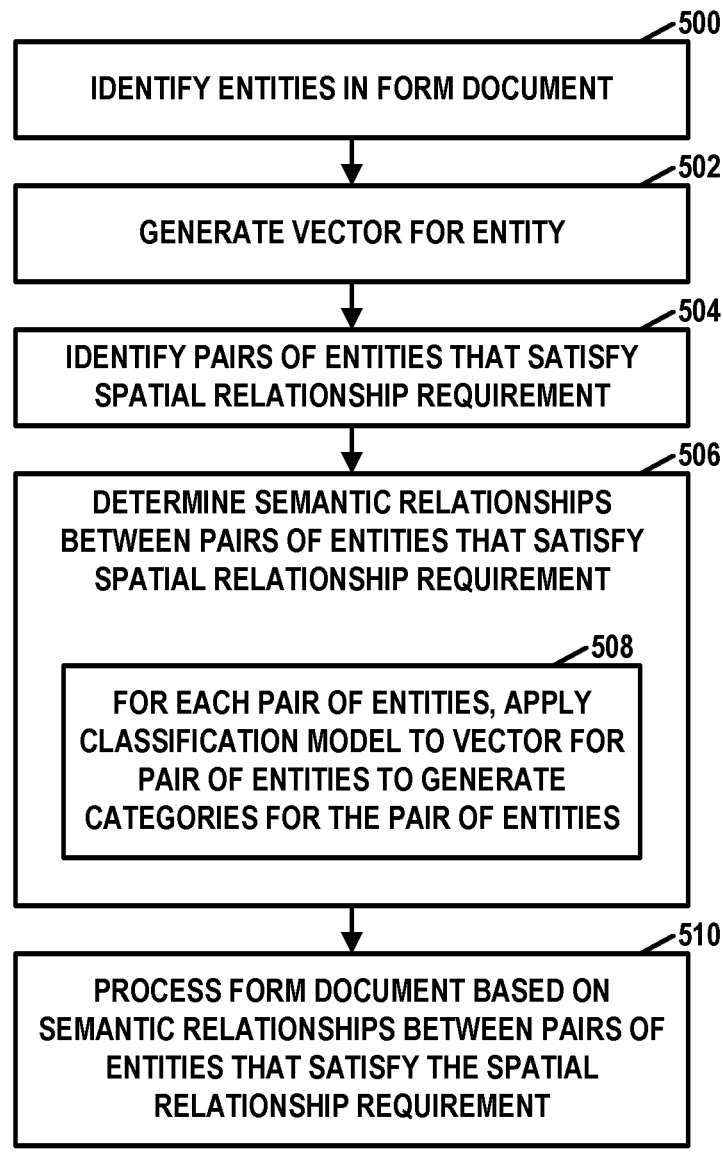
FIG. 5 is a flowchart illustrating an example operation according to techniques of this disclosure.

FIG. 5 is a flowchart illustrating an example operation according to techniques of this disclosure. The operation shown in FIG. 5 is provided as an example. Other example operations may include more, fewer, or different steps, or steps performed in different orders.

In the example of FIG. 5, form processing unit 116 may identify entities in a form document (500). For example, the identified entities may be a consolidated set of entities. In this example, OCR unit 200 of form processing unit 116 may apply OCR to the form document to determine an initial set of entities. Furthermore, in this example, sequence labeling unit 202 may combine entities in the initial set of entities to form the consolidated set of entities.

For each of the entities, vectorization unit 206 may generate a vector for the entity (502). The vector for the entity may comprise a plurality of values describing content of the entity and describe a position of the entity within the form document.

Furthermore, in the example of FIG. 5, spatial relationship unit 204 may identify pairs of the entities that satisfy a spatial relationship requirement (504). For example, spatial relationship unit 204 may determine that a pair of entities satisfies the spatial relationship requirement based on the entities being within a predetermined distance of each other in the form document. In some examples, spatial relationship unit 204 generates an adjacency matrix 212 that includes rows and columns corresponding to the entities. Adjacency matrix 212 may indicate that two of the entities are related based on the two entities satisfying the spatial relationship requirement.

Link classifier 208 may determine semantic relationships between pairs of the entities that satisfy the spatial relationship requirement (506). As part of determining semantic relationships between the pairs of the entities that satisfy the spatial relationship requirement link classifier 208 may, for each pair of entities satisfying the spatial relationship requirement, apply classification ML model 210 (508). Classification ML model 210 may take as input the vectors for the pair of entities and outputs a category for a first entity of the pair of entities and a category for a second entity of the pair of entities. A combination of the category for the first entity and the category for the second entity represents a semantic relationship between the first entity and the second entity. In some examples, the category for the first entity and the category for the second entity are in a plurality of categories that includes header, question, answer, and other. As described in greater detail elsewhere in this disclosure, classification ML model 210 may comprise an artificial neural network.

Consumer unit 118 may process the form document based on the semantic relationships between the pairs of the entities that satisfy the spatial relationship requirement (510). For instance, in an example where the form document is a prescription refill request form, consumer unit 118 may determine, based on the semantic relationships between the entities, whether to allow a prescription to be dispensed as requested in the prescription refill request form. For example, consumer unit 118 may determine, based on the semantic relationships, that the patient "John Smith" has been prescribed the drug codeine. Consumer unit 118 may then check whether a prescription of the drug codeine is appropriate for a diagnosis. In some examples, consumer unit 118 may output results of processing the form document for display on display device 106 (FIG. 1).

The following is a non-limiting list of examples in accordance with one or more techniques of this disclosure.

Example 1: A method includes identifying, by a computing system, entities in a form document; for each of the entities, generating, by the computing system, a vector for the entity, the vector for the entity comprising a plurality of values describing content of the entity and describing a position of the entity within the form document; identifying, by the computing system, pairs of the entities that satisfy a spatial relationship requirement; determining semantic relationships between pairs of the entities that satisfy the spatial relationship requirement, wherein determining semantic relationships between the pairs of the entities that satisfy the spatial relationship requirement comprises, for each pair of entities satisfying the spatial relationship requirement, applying, by the computing system, a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and processing, by the computing system, the form document based on the semantic relationships between the pairs of the entities that satisfy the spatial relationship requirement.

Example 2: The method of example 1, wherein the category for the first entity and the category for the second entity are in a plurality of categories that includes header, question, and answer.

Example 3: The method of any of examples 1 and 2, wherein the classification ML model comprises an artificial neural network.

Example 4: The method of any of examples 1 through 3, wherein: the entities in the form document are a consolidated set of entities, and identifying the entities in the form document comprises: applying, by the computing system, optical character recognition (OCR) to the form document to determine an initial set of entities; and combining, by the computing system, entities in the initial set of entities to form the consolidated set of entities.

Example 5: The method of any of examples 1 through 4, wherein identifying the pairs of the entities that satisfy the spatial relationship requirement comprises generating, by the computing system, an adjacency matrix that includes rows and columns corresponding to the entities, wherein the adjacency matrix indicates that two of the entities are related based on the two entities satisfying the spatial relationship requirement.

Example 6: The method of any of examples 1 through 5, wherein identifying the pairs of the entities that satisfy the spatial relationship requirement comprises determining, by the computing system, that a pair of entities satisfies the spatial relationship requirement based on the positions of the entities being within a predetermined distance of each other in the form document.

Example 7: The method of any of examples 1 through 6, wherein the form document is a prescription refill request form and processing the form document comprises determining, by the computing system, based on the semantic relationships between the pairs of the entities, whether to allow a prescription to be dispensed as requested in the prescription refill request form.

Example 8: A system includes a storage device configured to store a form document; and one or more processors implemented in circuitry and configured to: identify entities in the form document; for each of the entities, generate a vector for the entity, the vector for the entity comprising a plurality of values describing content of the entity and describing a position of the entity within the form document; identify pairs of the entities that satisfy a spatial relationship requirement; determining semantic relationships between pairs of the entities that satisfy the spatial relationship requirement, wherein the one or more processors are configured to, as part of determining semantic relationships between the pairs of the entities that satisfy the spatial relationship requirement, for each pair of entities satisfying the spatial relationship requirement, apply a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and process the form document based on the semantic relationships between the pairs of the entities that satisfy the spatial relationship requirement.

Example 9: The system of example 8, wherein the category for the first entity and the category for the second entity are in a plurality of categories that includes header, question, and answer.

Example 10: The system of any of examples 8 and 9, wherein the classification ML model comprises an artificial neural network.

Example 11: The system of any of examples 8 through 10, wherein: the entities in the form document are a consolidated set of entities, and the one or more processors are configured to, as part of identifying the entities in the form document: apply optical character recognition (OCR) to the form document to determine an initial set of entities; and combine entities in the initial set of entities to form the consolidated set of entities.

Example 12: The system of any of examples 8 through 11, wherein the one or more processors are configured to, as part of identifying the pairs of the entities that satisfy the spatial relationship requirement, generate an adjacency matrix that includes rows and columns corresponding to the entities, wherein the adjacency matrix indicates that two of the entities are related based on the two entities satisfying the spatial relationship requirement.

Example 13: The system of any of examples 8 through 12, wherein the one or more processors are configured to, as part of identifying the pairs of the entities that satisfy the spatial relationship requirement, determine that a pair of entities satisfies the spatial relationship requirement based on the positions of the entities being within a predetermined distance of each other in the form document.

Example 14: The system of any of examples 8 through 13, wherein the form document is a prescription refill request form and the one or more processors are configured to, as part of processing the form document, determine, based on the semantic relationships between the pairs of the entities, whether to allow a prescription to be dispensed as requested in the prescription refill request form.

Example 15: A non-transitory computer-readable storage medium includes identify entities in a form document; for each of the entities, generate a vector for the entity, the vector for the entity comprising a plurality of values describing content of the entity and describing a position of the entity within the form document; identify pairs of the entities that satisfy a spatial relationship requirement; determine semantic relationships between pairs of the entities that satisfy the spatial relationship requirement, wherein the instructions that cause the one or more processors to determine semantic relationships between the pairs of the entities that satisfy the spatial relationship requirement comprise instructions that, when executed, cause the one or more processors to, for each pair of entities satisfying the spatial relationship requirement, apply a classification machine-learned (ML) model that takes as input the vectors for the pair of entities and outputs a category for a first entity of the pair of entities and a category for a second entity of the pair of entities, wherein a combination of the category for the first entity and the category for the second entity represents a semantic relationship between the first entity and the second entity; and process the form document based on the semantic relationships between the pairs of the entities that satisfy the spatial relationship requirement.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, microcontrollers, FPGAs, or other equivalent integrated or discrete logic circuitry, as well as any combination of such components. Accordingly, the term "processor," as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:
1. A computer-implemented method comprising:
identifying, by one or more processors of a computing system, a plurality of entities in a form document;
for each entity of the plurality of entities, generating, by the one or more processors, a vector for the entity of a plurality of vectors, respectively, wherein the vector for the entity comprises a plurality of values describing content of the entity and describing a position of the entity within the form document;

identifying, by the one or more processors, a plurality of pairs of the plurality of entities that satisfy a spatial relationship requirement;

determining a plurality of semantic relationships between the plurality of pairs of the plurality of entities that satisfy the spatial relationship requirement, wherein determining the plurality of semantic relationships between the plurality of pairs of the plurality of entities that satisfy the spatial relationship requirement comprises, for each pair of entities in the plurality of pairs of entities satisfying the spatial relationship requirement, applying, by the one or more processors, a classification machine-learned (ML) model that takes as input a first vector and a second vector of the plurality of vectors for a first entity and a second entity of the pair of entities, respectively, and outputs a first category for the first entity of the pair of entities and a second category for the second entity of the pair of entities, wherein a combination of the first category for the first entity and the second category for the second entity represents a semantic relationship among the plurality of semantic relationships between the first entity and the second entity; and processing, by the one or more processors, the form document based on the plurality of semantic relationships between the plurality of pairs of the plurality of entities that satisfy the spatial relationship requirement.

2. The computer-implemented method of claim 1, wherein the first category for the first entity and the second category for the second entity are in a plurality of categories that includes header, question, and answer.

3. The computer-implemented method of claim 1, wherein the classification ML model comprises an artificial neural network.

4. The computer-implemented method of claim 1, wherein:
the plurality of entities in the form document is a consolidated set of entities, and
identifying the plurality of entities in the form document comprises:
applying optical character recognition (OCR) to the form document to determine an initial set of entities; and
combining ones of an initial plurality of entities in the initial set of entities to form the consolidated set of entities.

5. The computer-implemented method of claim 1, wherein identifying the plurality of pairs of the plurality of entities that satisfy the spatial relationship requirement comprises generating an adjacency matrix that includes a plurality of rows and a plurality of columns corresponding to the plurality of entities in the form document, wherein the adjacency matrix indicates that two entities of the plurality of entities in the form document are related based on the two entities satisfying the spatial relationship requirement.

6. The computer-implemented method of claim 1, wherein identifying the plurality of pairs of the plurality of entities that satisfy the spatial relationship requirement comprises determining that the pair of entities satisfies the spatial relationship requirement based on the position of the first entity and the position of the second entity of the pair of entities being within a predetermined distance of each other in the form document.

7. The computer-implemented method of claim 1, wherein the form document is a prescription refill request form and processing the form document comprises determining based on the plurality of semantic relationships between the plurality of pairs of the plurality of entities, whether to allow a prescription to be dispensed as requested in the prescription refill request form.

8. A system comprising:
one or more processors; and
one or more memories storing processor-executable instructions that, when executed by the one or more processors, cause the one or more processors to perform operations comprising:
identifying a plurality of entities in a form document;
for each entity of the plurality of entities, generating a vector for the entity of a plurality of vectors, respectively, wherein the vector for the entity comprises a plurality of values describing content of the entity and describing a position of the entity within the form document;
identifying a plurality of pairs of the plurality of entities that satisfy a spatial relationship requirement;
determining a plurality of semantic relationships between the plurality of pairs of the plurality of entities that satisfy the spatial relationship requirement, wherein determining the plurality of semantic relationships between the plurality of pairs of the plurality of entities that satisfy the spatial relationship requirement comprises, for each pair of entities in the plurality of pairs of entities satisfying the spatial relationship requirement, applying a classification machine-learned (ML) model that takes as input a first vector and a second vector of the plurality of vectors for a first entity and a second entity of the pair of entities, respectively, and outputs a first category for the first entity of the pair of entities and a second category for the second entity of the pair of entities, wherein a combination of the first category for the first entity and the second category for the second entity represents a semantic relationship among the plurality of semantic relationships between the first entity and the second entity; and
processing the form document based on the plurality of semantic relationships between the plurality of pairs of the plurality of entities that satisfy the spatial relationship requirement.

9. The system of claim 8, wherein the first category for the first entity and the second category for the second entity are in a plurality of categories that includes header, question, and answer.

10. The system of claim 8, wherein the classification ML model comprises an artificial neural network.

11. The system of claim 8, wherein:
the plurality of entities in the form document is a consolidated set of entities, and
identifying the plurality of entities in the form document comprises:
applying optical character recognition (OCR) to the form document to determine an initial set of entities; and
combining ones of an initial plurality of entities in the initial set of entities to form the consolidated set of entities.

12. The system of claim 8, wherein identifying the plurality of pairs of the plurality of entities that satisfy the spatial relationship requirement comprises generating an adjacency matrix that includes a plurality of rows and a plurality of columns corresponding to the plurality of entities in the form document, wherein the adjacency matrix indicates that two entities of the plurality of entities in the form document are related based on the two entities satisfying the spatial relationship requirement.

13. The system of claim 8, wherein identifying the plurality of pairs of the plurality of entities that satisfy the spatial relationship requirement comprises determining, that the pair of entities satisfies the spatial relationship requirement based on the position of the first entity and the position of the second entity of the pair of entities being within a predetermined distance of each other in the form document.

14. The system of claim 8, wherein the form document is a prescription refill request form and processing the form document comprises, determining, based on the plurality of semantic relationships between the plurality of pairs of the plurality of entities, whether to allow a prescription to be dispensed as requested in the prescription refill request form.

15. One or more non-transitory computer-readable storage media storing processor-executable instructions that, when executed by one or more processors, cause the one or more processors to perform operations comprising:
identifying a plurality of entities in a form document;
for each entity of the plurality of entities, generating a vector for the entity of a plurality of vectors, respectively, wherein the vector for the entity comprises a plurality of values describing content of the entity and describing a position of the entity within the form document;
identifying a plurality of pairs of the plurality of entities that satisfy a spatial relationship requirement;
determining a plurality of semantic relationships between the plurality of pairs of the plurality of entities that satisfy the spatial relationship requirement, wherein determining the plurality of semantic relationships between the plurality of pairs of the plurality of entities that satisfy the spatial relationship requirement comprises for each pair of entities in the plurality of pairs of entities satisfying the spatial relationship requirement, applying a classification machine-learned (ML) model that takes as input a first vector and a second vector of the plurality of vectors for a first entity and a second entity of the pair of entities, respectively, and outputs a first category for the first entity of the pair of entities and a second category for the second entity of the pair of entities, wherein a combination of the first category for the first entity and the second category for the second entity represents a semantic relationship among the plurality of semantic relationships between the first entity and the second entity; and
processing the form document based on the plurality of semantic relationships between the plurality of pairs of the plurality of entities that satisfy the spatial relationship requirement.

* * * * *